April 4, 1967  C. H. WHITLOCK  3,312,374
METERING AND MEASURING APPARATUS
Filed July 22, 1965  2 Sheets-Sheet 1

FIG. I

INVENTOR
CARL H. WHITLOCK

BY *Cullen, Sloman & Cantor*

ATTORNEYS

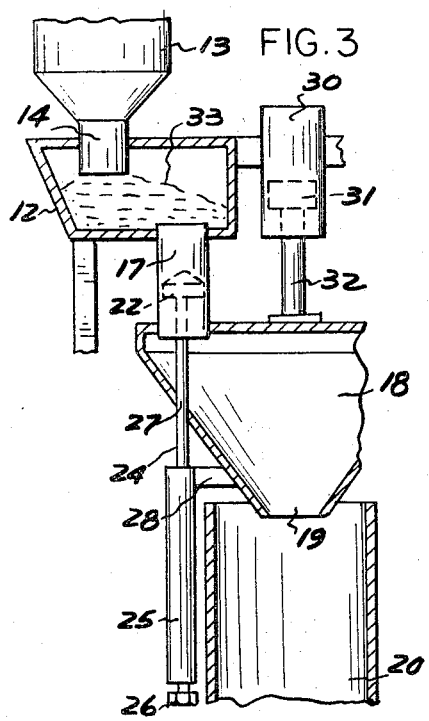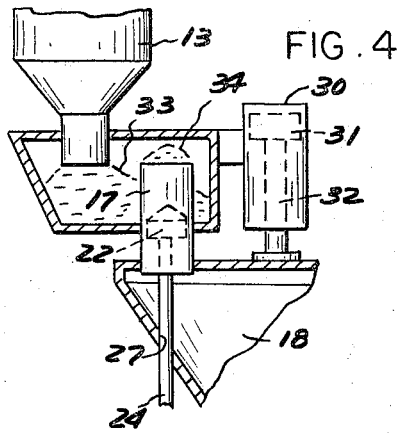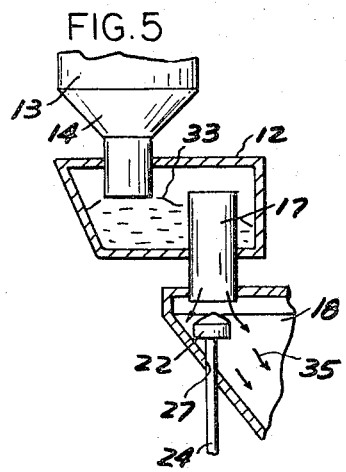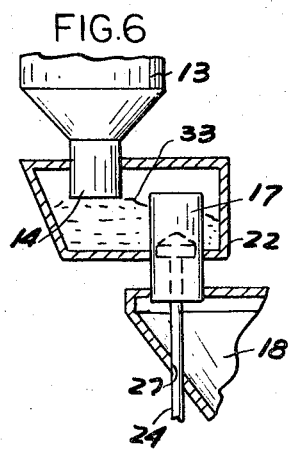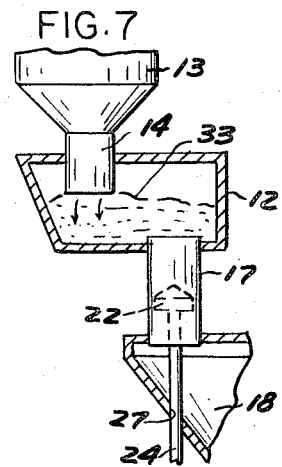
INVENTOR
CARL H. WHITLOCK
ATTORNEYS United States Patent Office 3,312,374
Patented Apr. 4, 1967

3,312,374
METERING AND MEASURING APPARATUS
Carl H. Whitlock, Birmingham, Mich., assignor to Whitlock Associates, Inc., Oak Park, Mich.
Filed July 22, 1965, Ser. No. 474,088
8 Claims. (Cl. 222—135)

This invention relates to a metering and mixing apparatus and more particularly to an apparatus for metering and mixing quantities of dry, granulated or pelletized types of material.

In the processing of dry, granulated or pelletized type of materials, such as molding plastics in raw material form, it is frequently necessary to mix different types of such materials together in predetermined quantities. For example, in feeding plastics to an extruder, the raw materials may comprise several types of plastics which must be mixed together in predetermined ratios before being fed to the extruder for melting and further processing.

Hence, it is an object of this invention to provide a simply constructed apparatus for automatically metering and mixing together quantities of dry, granulated or pelletized types of materials.

A further object of this invention is to provide an apparatus for metering and measuring materials, using gravity feed, wherein the metering is accomplished, in effect, by automatically scooping a predetermined quantity of the material from a chamber containing such material and then gravity dumping that material into a mixing container, from which the mixed material is gravity dumped into storage containers or the like.

These and other objects and advantages of this invention will become apparent upon reading the following description, of which the attached drawings form a part.

In these drawings:

FIG. 1 is an elevational view of the apparatus, shown partially in cross-section.

FIGS. 3–7 illustrate successive steps in the operation of the apparatus.

Figure 2:
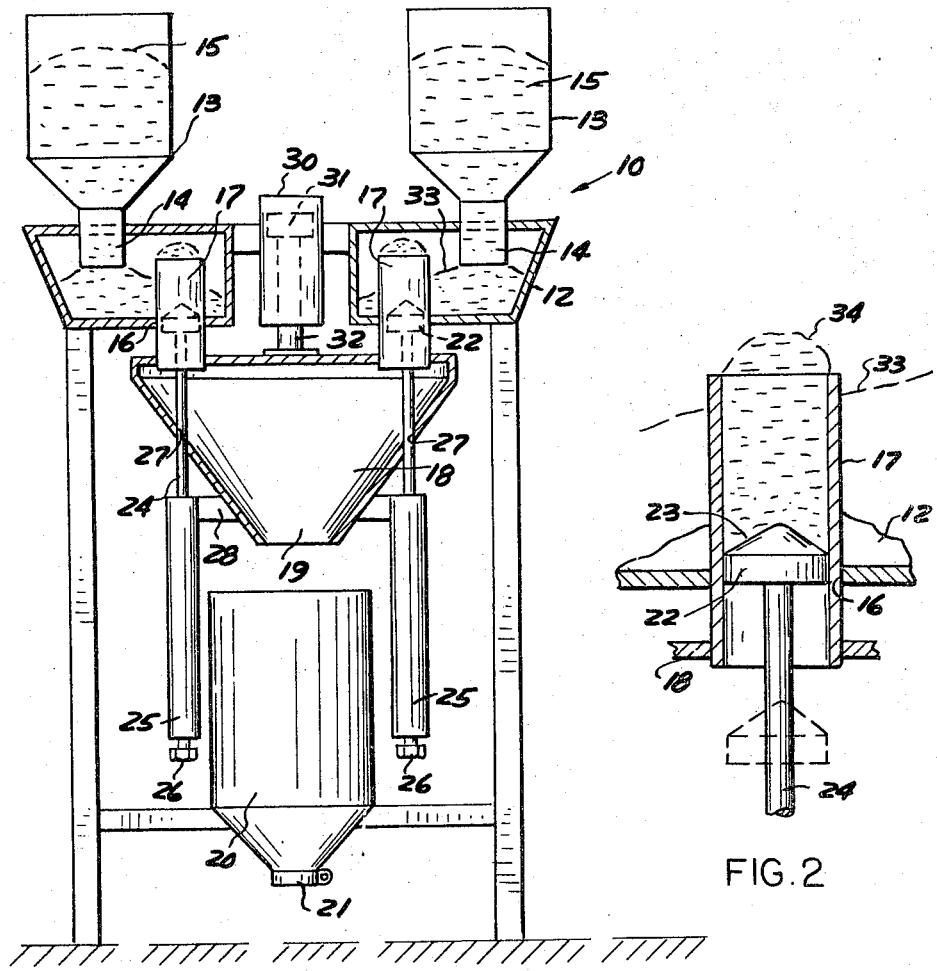
FIG. 2 is an enlarged, cross-sectional view of the metering cylinder portion of the apparatus.

Referring to FIGS. 1 and 2, the metering and measuring apparatus 10 is formed of a framework upon which is mounted a number of fill chambers 12. While only two fill chambers are illustrated, more may be used, with the number varying with the number of different types of materials to be metered and mixed together. The fill chambers are all spaced around a vertical axis. For example, if four such fill chambers are used, they would be horizontally aligned and spaced 90° apart around a vertical axis.

Above each of the fill chambers is a hopper 13 having a downwardly depending nozzle 14 extended into its respective fill chamber and terminating about midway between the top and bottom of the fill chamber. Each hopper 13 contains a quantity of the dry, granulated, or pelletized type of material 15.

Each fill chamber 12 is provided with an opening 16 in its bottom through which is extended a vertically arranged and vertically slidable cylinder 17. The lower end of each cylinder is fixedly secured to the upper end of a mixing container 18 which is in the form of an inverted, truncated cone having an open lower end 19 beneath which is located a storage container 20 having a bottom closure 21.

Each of the cylinders is provided with a closure in the form of a closure-piston 22, having a conical upper end 23, and connected to a piston rod 24. The piston rod slides into an adjustable type pneumatic cylinder 25, wherein the length of travel of the piston (not shown) contained within the cylinders 25 may be adjusted for thereby adjusting the amount of movement of the closure-piston 22. For adjustment of the movement of the piston rod 24, an adjustment nut 26 is provided. Such pneumatic cylinders are conventional and available upon the market and hence, are not further described in detail.

The pneumatic cylinders 25 are each secured to the mixing container 18 by means of suitable brackets 28. Their piston rods 24 each slidably fit through guide openings 27 formed in the wall of the mixing container 18.

The mixing container is movable vertically upwardly and downwardly. To effect such movement, a pneumatic or hydraulic cylinder 30 is mounted upon the frame above the mixing chamber and its piston 31 is connected to a plunger or piston rod 32 which in turn is connected to the upper end of the mixing chamber. Thus actuation of the cylinder 30 causes the mixing chamber to move upwardly or downwardly, as the case may be.

*Operation*

FIGS. 3–7 show the successive steps in the operation of this apparatus. Referring first to FIG. 3, the material contained within hopper 13, gravity feeds through nozzle 14, into the fill chamber 12 until the level 33 of the material in the chamber rises and blocks off the lower end of the nozzle 14 to stop the incoming flow of material. At this point, the mixing chamber 18 is in its lowermost position having been lowered by movement of its piston rod 32 of cylinder 30. In this position, the upper end of the cylinder 17 is located at the bottom of the fill chamber 12. Meanwhile, the closure-piston 22 is located within the cylinder 17 to act as a closure for the cylinder. By adjustment of the nut 26, the position of the closure-pison 22 may be adjusted to vary the volume of cylinder above it to thereby vary the volume of materials to be contained with the cylinder.

Thus, in FIG. 3 the apparatus is ready to meter the material, that is, it is ready for filling of its cylinders 17.

In the next step, shown in FIG. 4, the mixing chamber 18 is raised to its uppermost position. Now the upper end of the cylinder 17 is located above the level 33 of the material within the fill chamber so that the cylinder 17 is filled with material including a hump or overfill 34 at its upper end. During upward movement of the mixing chamber 18, the pneumatic cylinder 25 also moves upwardly to maintain the closure piston 22 in the same position, relative to the cylinder 17, as that shown in FIG. 3. The cylinder is now filled with material.

As shown in FIG. 5, the pneumatic cylinder 25 is then operated to retract its piston rod 24 and thereby lower closure piston 22 out of the cylinder 17 to dump the material within the cylinder into the mixing container, as shown by the arrows 35.

After the material has been dumped into the mixing container, the closure plunger 22 is returned to its closure position within the cylinder 17, as shown in FIG. 6. Thereafter, as shown in FIG. 7, the mixing chamber 18 is again lowered and on the downward stroke. Because some material has been removed from the fill chamber, the partial unblocking of the nozzle 14 results in more material entering the fill chamber to re-establish the normal material level 33. Thereafter, the cycle is again repeated.

While FIGS. 3–7 show only one cylinder, all the cylinders operate simultaneously. Thus, the materials contained within them slide down and swirl around the conical wall of the mixing chamber 18 and bunch together at opening 19, causing mixing. The mixed material drops down through opening 19 into the storage receptacle 20, from which it is removed in any conventional manner for further processing.

Since each of the closure pistons 22 may be separately adjusted within its respective cylinder 17, the fill volume of the cylinders may be adjusted for varying proportions of the mixture.

It is contemplated that the operation of this apparatus would be automatic using conventional automatic electrical controls, such as relays and the like to sequentially operate the cylinders 25 and 30. Controls of this character are conventional and readily available and therefore, details thereof are omitted.

This invention may be further developed within the scope of the following claims. Accordingly, it is desired that the foregoing description be read as being merely illustrative of an operative embodiment of this invention and not in a strictly limited sense.

Having fully described an operative embodiment of this invention, I now claim:

1. A metering and mixing apparatus comprising a fill chamber for containing material to be metered; a vertically arranged metering cylinder, having open upper and lower ends, extending into and having its upper end opening into said chamber through an opening formed in the bottom of said chamber; the lower end of said cylinder being fixedly secured to and opening into a mixing container; means for reciprocating the mixing container with its attached cylinder upwardly and downwardly for a distance slightly less than the height of said cylinder; a piston arranged within said cylinder for normally closing the lower end thereof, and means for lowering the piston, relative to the cylinder, for removing the piston from the cylinder, after the mixing container is moved upwardly and for raising the piston to close off the open lower end of the cylinder; whereby raising the mixing container causes the cylinder to rise within the chamber and fill with said material, and lowering the piston causes the material in the cylinder to dump into the mixing container.

2. A metering and mixing apparatus comprising a fill chamber for containing material to be metered; means for filling said chamber with said material to a level considerably below the top of said chamber; a vertically arranged, open ended cylinder slidably fitted into said chamber through an opening formed in the bottom of said chamber; a vertically movable mixing container arranged beneath said chamber and the lower end of said cylinder being fixedly secured to and opening into said container; means for raising and lowering said container a sufficient distance to position the upper end of the cylinder above the fill chamber material level and at the bottom of the fill chamber, respectively; a piston normally arranged within said cylinder for closing the lower end thereof and means for lowering the piston to a point beneath the cylinder, after the mixing container is moved upwardly, to open the lower end of the cylinder; whereby raising the mixing container causes the cylinder to raise within said chamber to fill the cylinder with said material, and lowering the piston causes the material contained in the cylinder to dump into the mixing container.

3. A construction as defined in claim 2, and including means for adjusting the position of the piston within the cylinder for adjusting the volume of the cylinder above the piston and thereby adjusting the volume of material filling the cylinder.

4. A construction as defined in claim 2, and the upper surface of said piston being conical in shape.

5. A construction as defined in claim 2, and including at least one additional fill chamber and cylinder with a piston, all identical to the first mentioned fill chamber and cylinder and piston, with the additional cylinder also being secured to and opening into the mixing container for simultaneously filling and dumping the cylinders.

6. A construction as defined in claim 5, and said mixing container being an inverted, truncated cone with an open lower end for receiving and mixing material received from said cylinders.

7. A construction as defined in claim 2, and said means for filling said chamber comprising a nozzle downwardly extending into said chamber to a point about midway between the top and bottom of the chamber, and a material containing hopper arranged above the chamber and opening into said nozzle for gravity feeding material into and through the nozzle, with the flow through the nozzle being blocked off, when the height of material beneath the lower end of the nozzle reaches and blocks off said nozzle lower end.

8. A metering apparatus comprising a plurality of horizontally aligned fill chambers for containing a dry, granulated type material, each chamber having an opening in its lower end; a vertically arranged, open ended cylinder slidably fitted into the opening of each chamber, with all of the cylinders being secured to and opening into a single container; said container being arranged beneath said chambers and being vertically movable and having means for vertically moving said container vertically upwardly to raise the upper ends of the cylinders above the level of material within their respective chambers and for moving the cylinders vertically downwardly for positioning the upper ends of the cylinders at the bottoms of their respective chambers; each cylinder having a closure normally closing off its bottom end, and means for opening said closures after the cylinders are raised for dumping the material contained within said cylinders into said container.

References Cited by the Examiner
UNITED STATES PATENTS

| | | | |
|---|---|---|---|
| 12,990 | 6/1855 | Butts | 222—356 X |
| 2,382,369 | 8/1945 | Smith | 222—356 X |
| 2,534,997 | 12/1950 | Smith | 222—356 X |
| 2,670,187 | 2/1954 | Goodrich | 222—145 X |
| 2,974,834 | 3/1961 | Foote et al. | 222—356 |

ROBERT B. REEVES, *Primary Examiner.*

K. N. LEIMER, *Assistant Examiner.*